Aug. 14, 1923.
J. M. DOBBINS
1,465,119
GUARD FOR MILK PAILS
Filed May 8, 1922
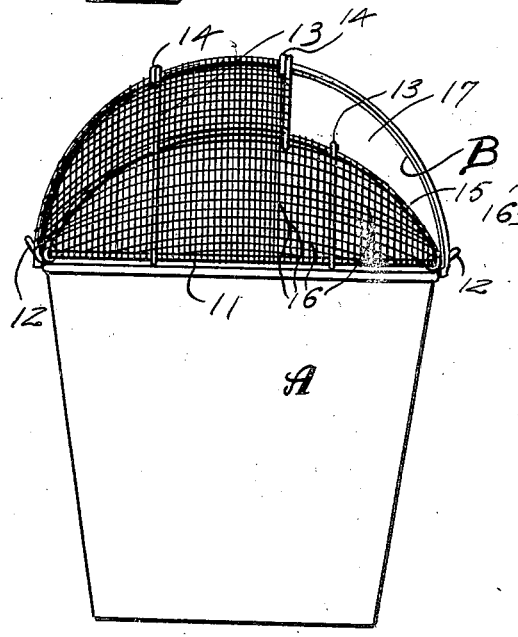
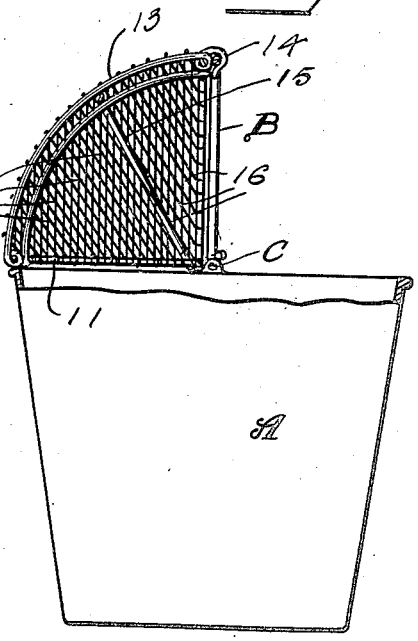
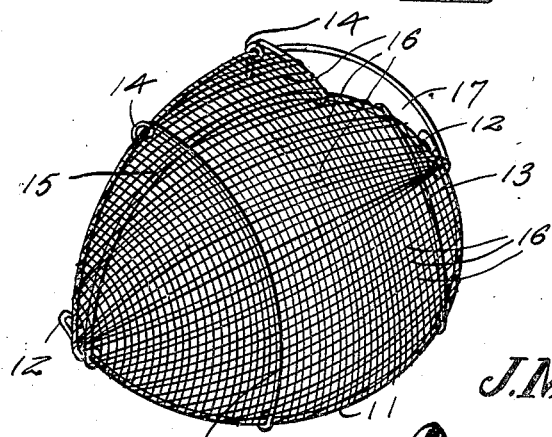
Inventor
J. M. Dobbins
By
Attorney Patented Aug. 14, 1923.

1,465,119

UNITED STATES PATENT OFFICE.

JOSEPH M. DOBBINS, OF RUTLEDGE, GEORGIA.

GUARD FOR MILK PAILS.

Application filed May 8, 1922. Serial No. 559,474.

*To all whom it may concern:*

Be it known that I, JOSEPH M. DOBBINS, a citizen of the United States, residing at Rutledge, in the county of Morgan and State of Georgia, have invented certain new and useful Improvements in a Guard for Milk Pails; and I do hereby declare the following to be a full, clear, and exact description of the invention, such as will enable others skilled in the art to which it appertains to make and use the same.

This invention relates to a guard for milking pails or buckets.

One important object is to provide a means whereby a cow's tail cannot enter the bucket through switching, to shoo flies from her body during the milking process and in this respect to aid sanitation.

It is also aimed to provide a guard which is readily attachable to and detachable from the handle or bail of the bucket in a novel and efficient manner.

It is further aimed to provide a construction which may be foraminous if desired and made of wire, having hooks to detachably engage the handle or bail of the bucket.

Additional objects and advantages will become apparent from a consideration of the description following, taken in connection with accompanying drawing illustrating one practical embodiment.

In said drawings:—

Figure 1 is a side elevation illustrating my improved guard in place on a milking pail;

Figure 2 is a vertical sectional view of the parts of Figure 1, and

Figure 3 is a perspective view of the guard.

Like reference characters designate like or similar parts in the different views.

By way of example, a milking pail or bucket is shown at A having a bail or handle B, usually pivoted at C thereto so as to be capable of assuming a horizontal or folded position against the bucket and a vertical or carrying position as shown in the drawings.

The improved guard is shown at 10. This guard may be of any suitable construction for instance having an arcuate rod at 11 adapted to rest on the upper edge of the bucket A and having terminal hooks at 12 adapted to clip removably to the bail B adjacent the pivot C. Intermediate the ends of the rod 11 are upstanding arcuate rods 13, connected to rod 11, and at their upper or free ends terminating in hooks 14 adapted to clip removably to the bail B. A reinforcing rod 15 is arcuate and secured to the rods 11 and 13 as shown and disposed in a plane extending at a right angle to that of the rod 11. The guard as a whole is preferably screen-like or foraminous and to this end a plurality of wires 16 may be secured to the rods or wires first mentioned. Said first mentioned rods or wires 11, 13 and 15 are preferably heavier and stronger than the wires 16. It will be understood that the wires or rods used in the manufacture of the article may be of any desired material, usually bendable or resilient metal so that the hooks 12 and 14 will resiliently clasp the bail B.

In use the guard 10 is applied to the pail A by attaching the hooks or clasps 12 and 14 thereto with the rod 11 resting on the upper edge of the pail A. During the milking operation, the guard is disposed with respect to the cow's tail, so that the cow cannot switch her tail into the milk while shooing flies from her body. While the milking operation is not in progress, the guard may be detached from the bail B simply by disengaging the clasps 12 and 14 therefrom.

At 17, the rod 15 terminates short of the bail B so as to provide a space to enable the milker's hand to engage or hold the bail B while milking, if desired.

As merely one practical embodiment has been illustrated and described, it will be understood that changes in the details may be resorted to provided they fall within the spirit and scope of the invention.

I claim as my invention:—

1. A guard for a pail consisting of a substantially horizontally disposed arcuate rod adapted to rest on a pail and provided with attaching hooks at the ends thereof, arcuate members extending upwardly from said rod and terminating in attaching hooks in substantially the same vertical plane with the first mentioned hooks, both sets of hooks being attachable to the bail of the pail, a covering on said rod and members, said covering being omitted at a portion thereof to facilitate engagement of the hand with the said bail while the guard is in place.

2. A guard for a pail consisting of a substantially horizontally disposed rod conforming in shape to the adjacent portion of and adapted to rest on a pail, rod members extending upwardly and inwardly from said rod and terminating relatively close to the upstanding position of the bail of the pail, a covering on said rod and rod members, and terminal hooks all disposed substantially in the same vertical plane extending from the rod and members and being attachable to said bail of the pail.

In testimony whereof I affix my signature in presence of two witnesses.

JOSEPH M. DOBBINS.

Witnesses:
T. B. LOADER,
W. C. ALLAN.